Dec. 13, 1960  L. P. OHLIGER  2,963,823
METHOD FOR MAKING FUSED MULTIFOCAL LENSES
Filed March 30, 1956

INVENTOR.
LEWIS P. OHLIGER
BY
*G. A. Ellestad*
ATTORNEY

United States Patent Office 2,963,823
Patented Dec. 13, 1960

2,963,823
METHOD FOR MAKING FUSED MULTIFOCAL LENSES

Lewis P. Ohliger, East Rochester, N.Y., assignor to Bausch & Lomb Optical Company, Rochester, N.Y., a corporation of New York Filed Mar. 30, 1956, Ser. No. 575,068

2 Claims. (Cl. 49—82.1)

This invention relates to ophthalmic lenses and more particularly it has reference to a method of making multifocal lenses of the type having a plurality of elements or pieces of glass of different refractive indices which are fused together along adjacent edges.

In making multifocal lenses of the type described, different dioptric powers of the different vision fields are provided by making composite segments by fusing together, along adjacent edges, two or more elements or pieces of glass having different refractive indices. The composite segment is ground and polished on one side and fused into a polished countersink on a major member of glass. The fused lens blank is then ground and polished to provide a finished lens in a manner well known in the art. The fused interface formed by the edge fusion of two elements or pieces of glass of different refractive indices presents a reflecting surface which produces annoying reflections for the wearer of the finished lens because the interface is in a plane which is substantially transverse to the plane of the major lens member and is located near the pupil of the eye of the wearer. Moreover, such reflections render the dividing line between the vision fields quite noticeable. Attempts have been made to reduce such reflections of the interface by treating the edges of glass before fusion but they have not been satisfactory because the interface has been thereby tinted or colored and so rendered relatively conspicuous and bothersome.

One of the objects of this invention is to provide an improved method of making fused multifocal lenses of the type described in which the reflections of light from the fused interface are reduced to a minimum and the interface is rendered less conspicuous. A further object is to provide such a method which will reduce the reflection of light at the fused interface without coloring or tinting so that the interface will not be conspicuous.

These and other objects and advantages will be apparent from the following specification taken in connection with the appended claims and drawing.

Referring to the drawings.

Figures 1, 2:
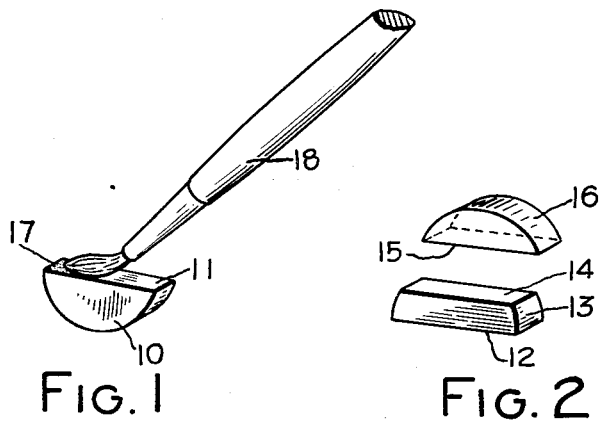
Fig. 1 illustrates a step in the method of practicing the invention by applying a material to the edge of a lens element.
Fig. 2 is a perspective view of two elements of glass used in making a composite disk or button for one type of multifocal lens embodying my invention.
Figures 3, 4:
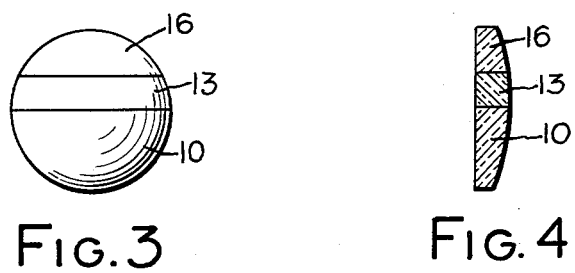
Fig. 3 is a front view of the fused composite disk made by edge fusing the pieces of glass shown in Figs. 1 and 2.
Fig. 4 is a vertical sectional view of the composite disk of Fig. 3.

One preferred method of practicing my invention is illustrated in the drawings wherein 10 indicates a piece of glass or element having an edge 11 which has been fine ground for fusion to the similarly ground bottom side or edge 12 of the piece of glass 13. The upper edge 14 of element 13 and the lower edge 15 of the element 16 are also suitably ground so that they may be fused together.

Under my improved method, the elements are first cleaned and then the edge 11 of the glass element 10 is treated by applying thereto a coating 17 of liquid bright palladium. The coating may be applied in any suitable manner as by means of a brush 18 which has been dipped in the solution of liquid bright palladium. The coating on the element is then permitted to dry and it will do so in about 8–15 minutes, depending on the temperature and humidity of the room. The glass elements 10, 13 and 16 are then placed in edge-to-edge contact and subjected to suitable fusing temperature after which the composite disk or segment is ground, polished and fused to the major blank of glass 19, in a manner well known in the art, to provide the blank shown in Fig. 5.

Figures 5, 6, 7:
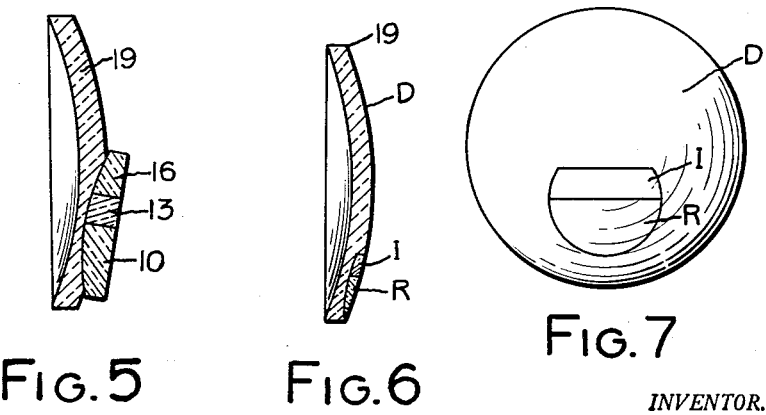
Fig. 5 is a vertical sectional view showing the composite disk fused to a major blank of glass.
Fig. 6 is a vertical sectional view of the lens blank after finishing the front side by grinding and polishing.
Fig. 7 is a face view thereof.

The fused blank is then ground and polished to produce the lens shown in Figs. 6 and 7 which has a distant vision field D, a reading or near vision field R and an intermediate vision field I. These fields of different dioptric powers are provided, for example, by making the element 10 of glass having a refractive index of 1.66 and the element 13 of glass having an index of 1.61. The element 16 is made of the same glass as the major blank 19 and both have a refractive index of 1.523. Since the element 16 and major blank 19 are formed of the same glass, they will merge upon fusion so that the finished lens will have the structure as shown in Figs. 6 and 7.

By treating the edge 11 of the glass element 10 in accordance with my invention, the fused interface formed at the juncture of edges 11 and 12 will be rendered less bothersome because the treatment substantially reduces the reflectivity of the interface. The interface which is thusly produced appears like a finely ground glass surface with a slightly greyish color so that it is not conspicuous. Furthermore, the interface or dividing line produced by my invention appears sharper and has fewer bubbles.

The liquid bright metal composition which is applied to the edge of the elements before fusing is one of the liquid bright metals such as are used in decorating glassware. Liquid bright gold, platinum, palladium and silver are essential oil solutions of resinates of the respective metals and are widely used in the ceramic arts for decorating glassware. For example, I have obtained good results by using liquid bright palladium No. 5365 supplied by E. I. du Pont de Nemours. Ten grams of this liquid bright palladium were mixed with 6–10 grams of toluene, reagent grade, to provide a mixture which was applied to the edge of the glass element by a single stroke of a camel's hair brush. I have also obtained good results by using liquid bright gold, but this material is more expensive than the liquid bright palladium.

While I have described the coating 17 as applied to the upper edge 11 of glass element 10, it could instead, and with equally good results, be applied to the bottom edge 15 of the glass element 16. The coating material 17 could be applied to both the lower edge 12 and the upper edge 14 of the glass element 13. However, in this type of multifocal lens the wearer experiences more annoying reflections from the fused interface between the elements 10 and 13 since this not only has a greater area in the finished lens than the interface between elements 13 and 16 but it is usually positioned slightly below or at the lower edge of the pupil of the wearer's eye and so produces reflections which are more bothersome to the wearer.

From the foregoing it will be apparent that I am able to attain the objects of my invention and provide an improved treatment for the interface between two elements of glass which are fused together in the manufacture of multifocal spectacle lenses.

I claim:

1. In a method for making multifocal lenses having a plurality of pieces of glass of different refractive indices fused together along adjacent edges, the steps of fine grinding the edges, applying to one of the edges a coating consisting of a diluted liquid bright composition, placing the coated edge of one piece in contact with the edge of another piece and then subjecting the pieces to a fusing temperature whereby the light reflecting properties of the fused interface will be decreased and it will be rendered less conspicuous.

2. A method of making a composite disk for use in producing a fused multifocal lens which comprises fine grinding an edge on each of two pieces of glass of respectively different refractive indices, coating at least one of said edges with a diluted liquid bright palladium composition, placing the two edges of said pieces of glass in contact with each other after the coating has dried and then subjecting the pieces of glass to a fusing temperature whereby the reflectivity of the fused interface is reduced.

References Cited in the file of this patent

UNITED STATES PATENTS

| | | |
|---|---|---|
| 1,954,353 | Ernst | Apr. 10, 1934 |
| 1,996,442 | Stanley | Apr. 2, 1935 |
| 2,169,194 | Geyer et al. | Aug. 8, 1939 |
| 2,462,020 | Craig | Feb. 15, 1949 |
| 2,704,420 | Ohliger | Mar. 22, 1955 |
| 2,733,167 | Stookey | Jan. 31, 1956 |
| 2,808,448 | Bleuze et al. | Oct. 1, 1957 |